Dec. 22, 1959  J. W. RITTENHOUSE ET AL  2,918,588
MEANS AND METHODS FOR SWITCHING A POLYPHASE CAPACITOR BANK
Filed Jan. 6, 1958
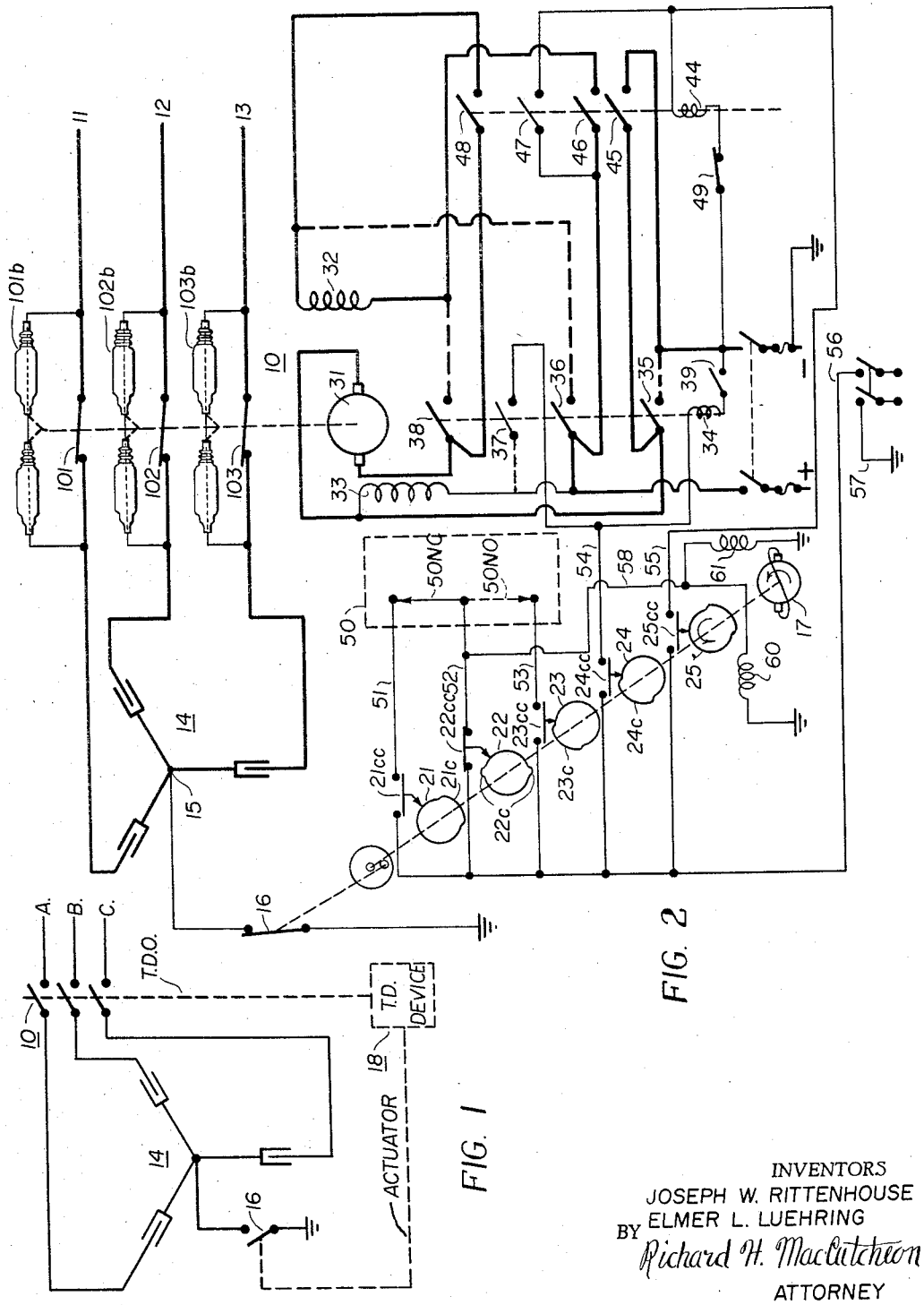
INVENTORS
JOSEPH W. RITTENHOUSE
BY ELMER L. LUEHRING
Richard H. MacCutcheon
ATTORNEY United States Patent Office 2,918,588
Patented Dec. 22, 1959

2,918,588

MEANS AND METHODS FOR SWITCHING A POLYPHASE CAPACITOR BANK

Joseph W. Rittenhouse, Mantua, and Elmer L. Luehring, Cleveland, Ohio, assignors to Hi-Voltage Equipment Company, a division of Joslyn Mfg. and Supply Company, Cleveland, Ohio, a corporation of Illinois Application January 6, 1958, Serial No. 707,396

4 Claims. (Cl. 307—94)

The present invention relates to high voltage switching for polyphase capacitor banks, and has particular significance in connection with means and methods for reducing the cost of associate equipment.

The reason for switches for connecting and disconnecting capacitor banks with respect to polyphase power lines is to provide optimum loading and power factor as is well known. In opening the circuit, the so-called recovery voltage affects the duty imposed upon the switch. If the recovery voltage at any instant after the current passes through zero exceeds the gap insulation at that instant, an arc will restrike and continue until the next current zero, when interruption will again be attempted. Maximum recovery voltage across a three-phase line switch attempting to disconnect a capacitor bank will be of varying magnitude, depending on whether the bank is connected Y or delta, and on nature of opening, particularly as regards sequence of opening with respect to original sequence of phases. For example, consider Fig. 1 attached, in which the showing is vastly simplified, for the line switch 10 would normally be a complicated and costly high voltage switch of the type having main current carrying contacts and cooperating interrupters such as arcing horns or bottle enclosed vacuum breaks mechanically associated with the main contacts so as to be separable subsequent to separation of the main current carrying contacts. If it be assumed that the voltage is rising first across A, then B, then C, and if the switch is opened in that sequence, then as the B phase switch opens, the voltage across the A phase switch will be 4.1 times peak line to ground voltage unless the neutral is grounded, in which case only three single phases are presented to the switch and the maximum recovery voltage will be two times line to ground peak volts. Calculations can readily be made to show that if the opening sequence were A—C—B, the maximum recovery voltage with a Y connected bank and the neutral ungrounded would be 3.47, and that if the bank were connected delta instead of Y other difficulties would be encountered.

Because of the normal wide spacing between phases of a three-phase switch as on towers, and because of light mechanical connections between them, and also because the phase voltages are 120° out of phase, it seems impossible to "open" all phases at once, and still the neutral cannot normally be left permanently grounded because that interferes with power system relaying and causes objectionable harmonic interference in nearby telephone lines.

It is an object of the present invention to provide simple and inexpensive means for overcoming the above mentioned difficulties.

Another object of the invention is to force the neutral of a three-phase capacitor bank to remain at ground potential during main line switching regardless of whether or not there is a fault on the system.

A further object of the invention is to provide economies in capacitor bank line switch installation through eliminating overvoltage on diverse phase line switches by establishing a controlled system of purposely grounding the neutral of the capacitor bank, at least during switching in the opening sense.

Other objects and advantages will become apparent and the invention may be better understood from consideration of the following description taken in connection with the accompanying drawing, in which:

Fig. 1 is a greatly simplified diagrammatic representation of apparatus useful for a method of switching according to the present invention;

Fig. 2 is a simplified diagram of apparatus and power and control circuit connections as found useful for performing the invention.

Referring first to Fig. 1, A, B, and C represent the three phases of a high voltage power line. A main breaker indicated generally at 10 may comprise, for each phase, a switch operating mechanism as disclosed in U.S. Patent 2,714,874, issued August 9, 1955, on an application filed by L. C. Hart, or may comprise, for each phase, a main switch blade and cooperating contacts encased in vacuum bottles and for opening after the main switch opens. Through the switch 10 and associated connections a three-phase capacitor bank indicated generally at 14 is selectively connected to, or disconnected from, the line A—B—C. The bank has a neutral point as shown, and a switch 16 is provided in accordance with the present invention to selectively connect the neutral to ground or to disconnect this bank neutral from ground. In accordance with one aspect of the invention, a time-delay device indicated generally at 18 is used to assure that the main switch 10 cannot be opened until the ground switch 16 has been closed, although it should be understood that interlocking to accomplish this would not necessarily have to be either mechanical or electrical, for reliance could be had upon the brain of a human operator instead.

Referring now to Fig. 2, I have shown a main switch 10 having three phase portions 101, 102, 103 adapted to place across the line 11—12—13 a polyphase capacitor bank indicated generally at 14. The bank is Y connected with a neutral point 15 connected through switch 16 to ground. Switch 16 is arranged to be operated by a single-phase repulsion-induction gear motor 17 and, as hereafter described, electrical connections are such as to tie the motor operation of the grounding switch in with the main switch 10 in such manner as to be analogous to operation of the time-delay device 18 already briefly referred to in connection with Fig. 1. Multiple cam discs 21-25 are arranged for rotation with the grounding switch drive shaft. Thus, as shown, cam disc 21 may be provided with a sector cam 21c operating a cam contact 21cc (normally open), cam disc 22 may have 180° nubs or cams 22c for operating cam contact 22cc (normally closed), cam disc 23 may have a sector cam 23c for operating cam contact 23cc (normally open), and so on. Through the intermediary of these cams, and as one way of accomplishing our invention, we provide a motor control for the ground switch and interlocked motor control for the main switch 10 which, as illustrated, is driven by a reversing motor having an armature 31, a series field 32, and a brake release coil 33. This main switch motor is adapted to be energized by an "Opening" contactor having a coil 34, and main motor "Opening" circuit contacts 35–38. For reverse operation (for driving the motor in the closing direction), there is a "Closing" contactor coil 44 and contacts 45–48. To prevent overtravel, limit switches 39, 49 may be actuated by cams on the main switch drive shaft in such sense that 39 will be closed only when the main switch is closed and 49 will be closed only when the main switch is open. Electrically, these limit switches are arranged in circuit with the contactor coils so that coil 34 can be initially energized only when the main switch is closed and coil 44 can be initially energized only when the main switch is open. A source of power, indicated on the drawing as "+" and "—," is connected as through fuses and a disconnect switch to power the motor through operation of the respective contactors.

It is assumed that the main switch is operating on a polyphase line of a voltage so high as to require auxiliary arc-breaking equipment, as is most always the case when there are capacitor bank installations. In the illustrated embodiment this auxiliary equipment is schematically shown as series connected vacuum breaks 101b connected around main switch 101, series connected vacuum breaks 102b connected around main switch 102, etc., and it will be understood by those in the art that some provision will be made for assuring that each main switch will open before the associated vacuum breaks have opened in order that destructive arcing will not occur on the main switch, and that each main switch will close before the associated vacuum breaks close in order that the vacuum interrupters will not be subjected to high inrush currents. Such interlocking, usually mechanical, is not detailed in Fig. 2 because it forms no part of the present invention and is already well understood by those in the art.

According to preference of the particular customer, various sorts of apparatus may be used to initiate operation of the system, but let it be assumed that customer desires a time clock, as indicated generally at 50, and which has what may be thought of as a normally closed contact 50NC for initiating operation which ultimately results in opening the main switch, together with a normally open contact 50NO, which initiates operation ultimately resulting in closing of the main switch 10. These contacts are interlocked through the wires 51–53 with three of the ground switch shaft cam contacts 21cc–23cc to a source of control power at 56—57, which thus operates (at proper time) to energize the field 60 and the brake release coil 61 for unidirectional action of the ground switch operating motor 17, and at proper intervals the ground switch shaft cam contacts 24cc and 25cc are effective through connections 54, 55 to energize either the main switch opening contactor coil 34 or the main switch closing contactor coil 44, which ultimately results in energizing the main switch motor brake release coil 33 and armature 31 and series field 32 to open or close the main switch, as the case may be.

In Fig. 2 the ground switch operating shaft cams and the cam contacts are shown in the position they assume at the beginning of main switch open operation with the grounding switch closed, and a circuit may be traced from the control power hot line 56 through 22cc, wire 52, jumper 58, and field 60 of the repulsion motor indicated generally at 17 and which operates unidirectionally in the direction shown by the unnumbered arrows, ultimately operating the ground switch 16 through a crank and connecting rod as shown. When the grounding switch 16 is full closed, 24cc will close, sending a signal through connection 54 to the main switch "Open" contactor coil 34, eventually energizing motor 31—33 in such a sense as to open the bottles and main switch 10. Meanwhile, the grounding switch shaft operates until cam 22 goes a small part of a turn to break the power circuit for the repulsion motor.

When the time clock 50 subsequently signals closing of the main switch circuit, a circuit may be traced from 56, through 23cc, wire 53, switch 50NO, wire 58, field 60, to operate the grounding switch motor and open the grounding switch 16, the circuit through 24cc is broken, and a circuit is made through 25cc, wire 55, "Close" contactor coil 44, limit switch 49 (now closed because main switch is open), and through the main motor switch and fuse to ground.

Unlike some prior arrangements, according to the present invention a capacitor bank neutral will, at the proper time, be deliberately and positively grounded, whether or not there is a "fault" anywhere in the high voltage system, and thus is prevented the overvoltage which would otherwise occur regardless of whether there exists such a fault and the main switch including associate interrupters need only be designed to withstand a 2 to 1 rather than a 4.1 to 1 factor of normal peak line to ground voltage.

With methods and apparatus according to the invention, and if it has been decided to use vacuum break interrupters in connection with the main switch, it is possible to save up to 50 percent of the cost of vacuum interrupter equipment by thus reducing the maximum recovery voltage demand made upon the main switch. Of course there will be some new expense for the ground switch and its control, but dollarwise it has been found that with the invention the cost of a complete capacitor bank switching installation for a 115 kv. line can be reduced from $17,000 to $12,000, or, for a 69 kv. line the savings represent the difference between $9,000 and the usual $12,000.

While we have illustrated and described a specific embodiment, numerous modifications may obviously be made without departing from the true spirit and scope of our invention. It is not, for example, always important whether the ground switch opens before the main switch closes or whether the ground switch opens after the main switch closes; either arrangement is believed to be within the present invention, which we intend to have defined only by the appended claims taken with all reasonable equivalents.

We claim:

1. In combination with a high voltage three-phase line, a Y connection with a capacitor in each leg of the Y, a three-phase high voltage first switch arranged to disconnect the Y connection with respect to the line, motor means for operating said first switch, a ground connection, a grounding switch arranged to connect the neutral of the Y to said ground connection, means for operating the grounding switch, interlocking cam means constructed and arranged to interlock the motor means for operating the first switch to the means for operating the grounding switch so that the first switch cannot be opened until the grounding switch is closed whereby to effect economies in the construction of the first switch, and interlocking means constructed and arranged to interlock the means for operating the grounding switch to the motor means for operating the first switch so that the grounding switch will open before, when, or after the main switch closes whereby to substantially prevent harmonics.

2. In combination with a high voltage polyphase line having a line to neutral capacitor in each phase of the line, a polyphase switch arranged to disconnect the capacitors with respect to the line, a ground connection, a grounding switch arranged to connect the neutral of the capacitors to said ground connection, means for operating the polyphase switch, means for operating the grounding switch, means interlocking the switches so that the polyphase switch can not be opened until the grounding switch is closed, and means assuring that the grounding switch is normally open when the polyphase switch is closed.

3. Method of switching with respect to a polyphase line a polyphase capacitor bank having a neutral, which method comprises the steps of grounding said neutral, thereafter disconnecting the bank from the line, and thereafter disconnecting the neutral grounding.

4. A method of switching a Y connected capacitor bank with respect to a high voltage polyphase line, which method comprises the steps of grounding the neutral point of the Y connected capacitor bank while disconnecting the bank from the line, and disconnecting the grounding of said neutral point during normal operation of said bank connected to said line, whereby to effect economies in cost of equipment without causing substantial telephone interference.

References Cited in the file of this patent

UNITED STATES PATENTS 2,779,879      Speice  ------------------ Jan. 29, 1957